United States Patent
Song et al.

(10) Patent No.: US 6,868,307 B2
(45) Date of Patent: Mar. 15, 2005

(54) ROBOT CLEANER, ROBOT CLEANING SYSTEM AND METHOD FOR CONTROLLING THE SAME

(75) Inventors: Jeong-gon Song, Gwangju (KR); Yun-sup Hwang, Gwangju (KR)

(73) Assignee: Samsung Gwangju Electronics Co., Ltd., Gwangju (KR)

( * ) Notice: Subject to any disclaimer, the term of this patent is extended or adjusted under 35 U.S.C. 154(b) by 129 days.

(21) Appl. No.: 10/370,807

(22) Filed: Feb. 20, 2003

(65) Prior Publication Data

US 2004/0088080 A1 May 6, 2004

(30) Foreign Application Priority Data

Oct. 31, 2002 (KR) ................................ 10-2002-0066741

(51) Int. Cl.[7] .............................................. G06F 19/00
(52) U.S. Cl. ..................... 700/245; 700/259; 700/246; 700/249; 700/250; 700/256; 700/264; 318/568.1; 318/568.12; 318/580; 318/581; 318/587; 701/23; 701/24; 701/25; 701/26; 901/47
(58) Field of Search ................................ 700/245, 259, 700/246, 249, 250, 256, 264; 318/568.1, 568.12, 580, 581, 587; 701/23–26; 901/47

(56) References Cited

U.S. PATENT DOCUMENTS

| | | |
|---|---|---|
| 5,051,906 A | 9/1991 | Evans, Jr. et al. |
| 5,446,356 A | 8/1995 | Kim |
| 6,496,754 B2 * | 12/2002 | Song et al. ............... 700/245 |
| 6,748,297 B2 * | 6/2004 | Song et al. ............... 700/259 |

FOREIGN PATENT DOCUMENTS

| | | |
|---|---|---|
| EP | 1003088 | 5/2000 |
| JP | 5084200 | 4/1993 |

* cited by examiner

Primary Examiner—Thomas G. Black
Assistant Examiner—McDieunel Marc
(74) Attorney, Agent, or Firm—Ladas & Parry LLP

(57) ABSTRACT

A robot cleaner, a robot cleaning system and a method for controlling the same capable of efficiently performing work on command by recognizing the driving distance and direction of the robot cleaner regardless of a of wheel slippage or irregularity in the floor. The robot cleaner performs a working operation while moving about a floor, and comprises a main body, a driving unit for driving a plurality of wheels disposed on a bottom portion of the main body, a downward-looking camera disposed among the wheels on the bottom portion of the main body for photographing images of the floor perpendicular to the driving direction of the robot cleaner, and a control unit for recognizing driving distance and direction of the wheels using image information of the floor photographed by the downward-looking camera, and for controlling the driving unit corresponding to a target work by using the recognized distance and direction of the wheels. An upward-looking camera can photograph and use information relating to spatial orientation for determining and correcting driving distance and direction.

10 Claims, 6 Drawing Sheets

ROBOT CLEANER, ROBOT CLEANING SYSTEM AND METHOD FOR CONTROLLING THE SAME

BACKGROUND OF THE INVENTION

1. Field of the Invention

The present invention relates generally to a robot cleaner, a robot cleaning system and a method for controlling the same, and more particularly to a robot cleaner, a robot cleaning system and a method for controlling the same that is capable of recognizing driving distance and direction to arrange a driving path by using image information of a floor photographed while the robot cleaner is driving around the floor.

2. Background of the Related Art

A conventional robot cleaner drives along an outline of a work area that is surrounded by a wall or obstacle by using an ultrasonic sensor installed in a main body to determine the extent of the work area, and then plans a driving path for its work, such as cleaning or security work, in the predetermined work area. The robot cleaner, then, calculates driving distance and current position by using a signal detected by a sensor such as an encoder capable of detecting a number and angle of rotation of wheels for driving the wheels to move along the planed driving path. However, the above generally used method for driving the robot cleaner along the driving path may produce errors between the driving distance and position calculated from the signal detected by the sensor and the actual driving distance and position due to an irregularity of the floor, slip of the wheels, etc. The more distance over which the robot cleaner drives, the more the position recognition errors may be accumulated. The accumulated position errors may accordingly cause the robot cleaner to deviate from the planned driving path. Consequently, cleaning may not be performed for some of the predetermined area, or may be repeatedly performed for other areas, whereby cleaning efficiency can diminish and security work may not be performed in some cases.

Accordingly, a necessity has risen for a robot cleaner capable of efficiently performing commanded work by accurately detecting the driving distance and direction to precisely arrange a driving path regardless of slip of wheels, irregularity of the floor or some other error producing event.

SUMMARY OF THE INVENTION

An object of the invention is to solve at least the above problems and/or disadvantages and to provide a robot cleaner, robot cleaning system and method for controlling the same capable of efficiently performing commanded work by precisely recognizing the driving distance and direction of the robot cleaner.

The foregoing objects and advantages are realized by providing a robot cleaner for performing working operations while moving about a floor, comprising: a main body; a driving unit for driving a plurality of wheels disposed on a bottom portion of the main body; a downward-looking camera disposed among the wheels on the bottom portion of the main body for photographing images of the floor perpendicular to the driving direction of the robot cleaner; and a control unit for recognizing driving distance and direction of the wheels using image information of the floor photographed by the downward-looking camera, and for controlling the driving unit corresponding to the target work by using the recognized stored distance and direction of the wheels.

Preferably, the control unit compares the current image of the floor photographed by the downward-looking camera with previous images of the floor stored by the downward-looking camera so as to recognize the driving distance and direction of the wheels. Here, it is preferably that the downward-looking camera photographs images of the floor at a rate of 1500 times per second.

Preferably, the robot cleaner further comprises an illuminator disposed on the bottom portion of the main body for illuminating an area photographed by the downward-looking camera so as to render it brighter than surrounding areas.

According to another aspect of the invention, a robot cleaner for performing working operations while moving about a floor, comprises: a main body; a driving unit for driving a plurality of wheels disposed on a bottom portion of the main body; a downward-looking camera disposed among the wheels on the bottom of the main body for photographing images of the floor perpendicular to the driving direction of the robot cleaner; an upward-looking camera disposed on a top of the main body for photographing images of a ceiling perpendicular to the driving direction; and a control unit for recognizing the position of the robot cleaner by using image information of the ceiling photographed by the upward-looking camera and for recognizing a driving distance and direction of the wheels by using image information of the floor photographed by the downward-looking camera, and further for controlling the driving unit corresponding to a target work by using the recognized position, distance and direction.

Here, the control unit compares the current image of the floor photographed by the downward-looking camera with previous images of the floor stored by the downward-looking camera to recognize the driving distance and direction of the wheels.

The foregoing objects and advantages are further realized by providing a robot cleaning system comprising: a robot cleaner including: a main body, a driving unit for driving a plurality of wheels disposed on a bottom portion of the main body, and an upward-looking camera disposed on a top of the main body for photographing images of a ceiling perpendicular to a direction of driving the robot cleaner; and a remote control unit for communicating wirelessly with the robot cleaner, wherein the robot cleaner further includes a downward-looking camera disposed among the wheels on the bottom portion of the main body for continuously photographing images of the floor perpendicular to the driving direction, and the remote control unit recognizes a driving distance and direction of the wheels by using image information of the floor photographed by the downward-looking camera and controls the driving unit corresponding to the targeted work by using the recognized distance and direction of the wheels.

Here, the remote control unit compares the current image of the floor photographed by the downward-looking camera with previous images of the floor stored by the downward-looking camera so as to recognize the driving distance and direction of the wheels.

Preferably, the robot cleaning system further comprises an illuminator disposed on the bottom of the main body for illuminating an area photographed by the downward camera brighter than surrounding areas.

The foregoing object and advantage are further realized by providing a method for controlling a robot cleaner having a downward camera, comprising the steps of: calculating a driving path to a target area corresponding to a work, upon receiving a work command; storing images of a floor photographed by the downward camera; driving the robot cleaner along the calculated driving path; and comparing a current image of the floor photographed by the downward camera with the stored images to calculate a driving distance and direction, and arranging the driving path.

With the above described robot cleaner, robot cleaning system and method for controlling the same, the driving distance and direction of the robot cleaner are recognized by using the images of the floor photographed by the downward camera to arrange the driving path, thereby capable of efficiently performing the commanded work.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the drawings in which like reference numerals refer to like elements wherein:

FIG. 4b is a top view showing an image of the floor photographed by the downward camera of the robot cleaner while moving forward from the state in FIG. 4a;

FIG. 4c is a top view showing an image of the floor photographed by the downward camera of the robot cleaner while moving backward from the state in FIG. 4a;

FIG. 4d is a top view showing an image of the floor photographed by the downward camera of the robot cleaner while moving to a right from the state in FIG. 4a;

FIG. 4e is a top view showing an image of the floor photographed by the downward camera of the robot cleaner while moving to a left from the state of FIG. 4a;

FIG. 4f is a top view showing an image of the floor photographed by the downward camera of the robot cleaner while moving at about 45 degree angle to the left from the state in FIG. 4a;

DETAILED DESCRIPTION OF PREFERRED EMBODIMENTS

The preferred embodiments of the invention will be hereinafter described in detail with reference to the accompanying drawings.

Figure 1:
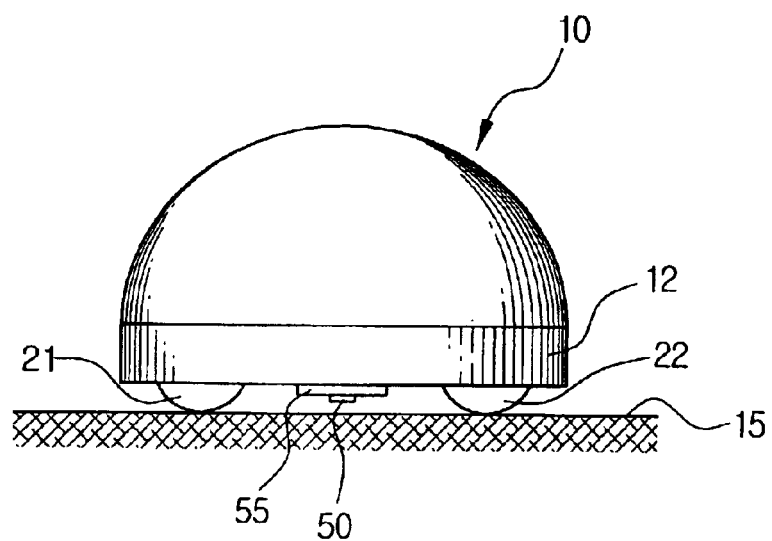
FIG. 1 is an elavational view showing a robot cleaner used for photographing images of a floor while moving thereabout in accordance with the invention.
Figure 2A:
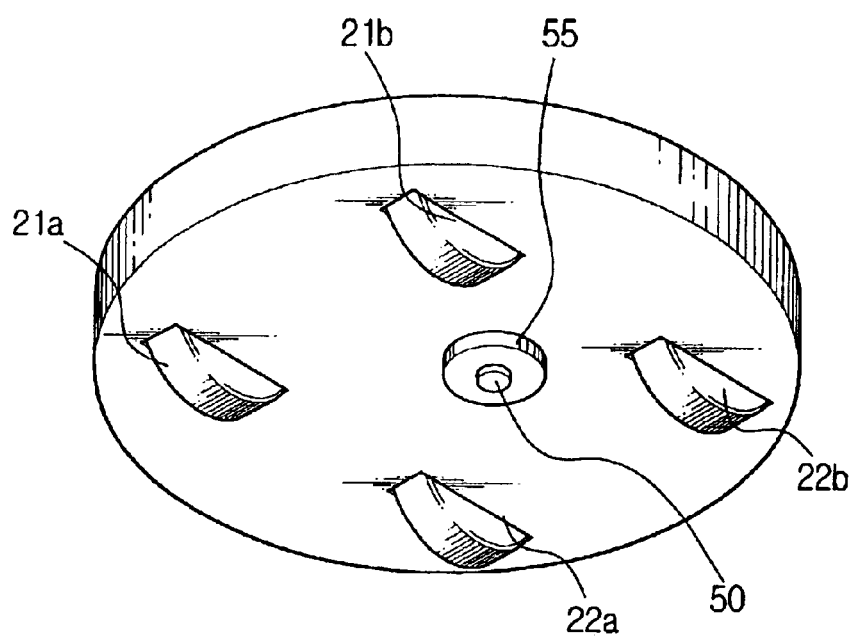
FIG. 2a is a perspective view showing the bottom portion of the robot cleaner of FIG. 1.
Figure 2B:
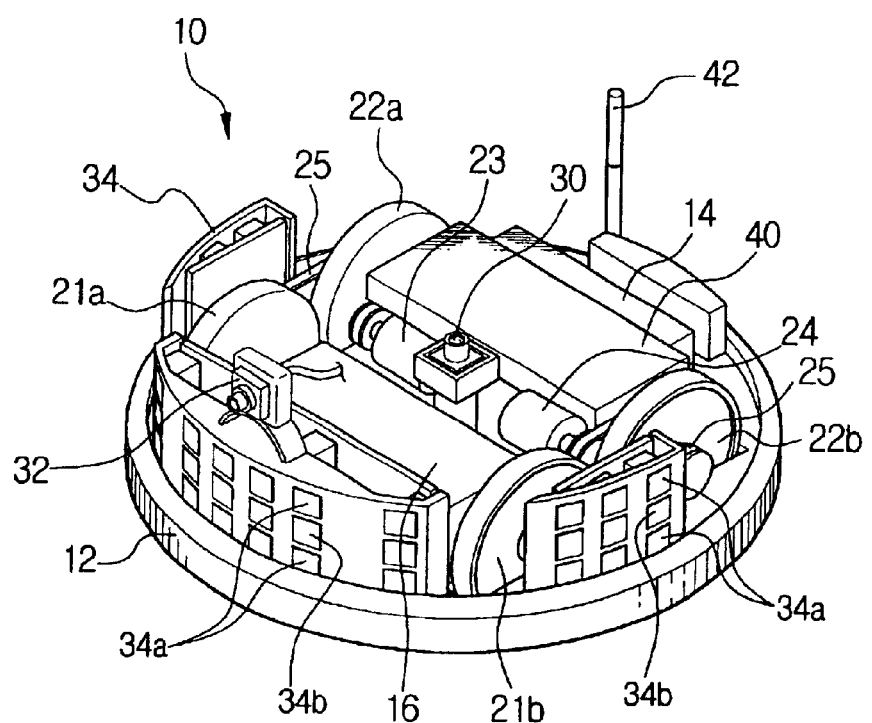
FIG. 2b is a perspective view showing the robot cleaner of FIG. 1 with the upper cover separated therefrom.

Referring to FIGS. 1, 2A and 2B, a robot cleaner 10 is provided with a main body 12, a suction unit 16, a driving unit 20, an upward-looking camera 30, a forward-looking camera 32, obstacle detection sensors 34, a downward-looking camera 50, an illuminator 55, a control unit 40, a memory 41 and a transmitter/receiver unit 43. The power source may comprise a stored electrical source, such as battery 14.

The suction unit 16 is installed on the main body 12 in order to collect dust on a surface, such as a floor, to be cleaned while drawing in air. The suction unit 16 can be constructed using well-known methods. The suction unit 16, as an example, may have a suction motor (not shown), and a suction chamber, for collecting dust drawn in through a suction hole or a suction pipe formed on, for example, the underside of the body 12, opposite to the floor to be cleaned, by driving of the suction motor.

The driving unit 20 comprises two wheels 21a, 21b disposed at both sides of the front of the body 12, two wheels 22a, 22b disposed at both sides of the back of the body 12, motors 23, 24 for rotatably driving the back wheels respectively and timing belts 25 for transmitting power generated to the back wheels 22a, 22b by the motors 23, 24 to the front wheels 21a, 21b. The driving unit 20 rotatably drives the motors 23, 24 respectively in a forward or reverse direction in accordance with control signals received from the control unit 40. The driving direction of the robot 10 can be determined by controlling the motors 23, 24 to have different amounts of rotation.

The forward-looking camera 32 is installed on the main body 12 in order to photograph front images looking in a forward direction. The forward-looking camera 32 outputs the photographed images to the control unit 40.

The upward-looking camera 30 is disposed on the main body 12 in order to photograph upper images of a ceiling in an upward-looking direction. The upward-looking camera 30 outputs the photographed images to the control unit 40. Preferably, the upward-looking camera comprises a fisheye lens (not shown).

Fisheye lenses have at least one lens designed to provide a wide view angle to the camera, similar to the eyes of a fish, for example, and may generate an image up to about 180 degrees. The fisheye lens is designed to fit to a required range of view angles while including an allowable distortion. A detailed description of the fisheye lens will be omitted here. However, such a fisheye lens is disclosed in Korean Patents Nos. 1996-7005245, 1997-48669, 1994-22112, etc., and is available from various lens makers.

The obstacle detection sensors 34 ate disposed around a cylindrical side wall of the body at predetermined intervals, and are provided for transmitting signals externally of the body 12 and receiving the reflected signals. Each of the obstacle detection sensors 34 has a plurality of infrared ray luminous elements 34a for projecting infrared rays and light-receiving elements 34b for receiving reflected infrared rays. The infrared ray luminous elements 34a and light-receiving elements 34b are disposed along an outer circumference of each of the obstacle detection sensors 34 by perpendicularly arranged pairs. The obstacle detection sensors 34 may also adopt an ultrasonic sensor capable of projecting ultrasound and receiving a reflected ultrasound vibration. The obstacle detection sensors 34 may be used for measuring the distance between the robot cleaner and an obstacle or an adjacent wall.

The downward-looking camera 50 is disposed on the main body 12 in order to photograph images of the floor in a downward-looking direction. The downward-looking camera 50 outputs the photographed images to the control unit 40. The downward-looking camera 50 is capable of photographing images at high speeds for rapid and precise recognition of the driving path of the robot. Preferably, a downward-looking camera capable of photographing about 1500 times per a second may be used.

The illuminator 55 is disposed around the downward-looking camera disposed under the main body 12 for illuminating an area in the floor photographed by the downward-looking camera 50. The illuminator 55 constantly illuminates the area photographed by the downward-looking camera so as to make it brighter than the surrounding areas. The illuminator 55 enables the downward-looking camera to detect minor differences in the floor and minimizes the changes in the photographed images due to surrounding illumination.

The control unit 40 processes received signals through the transmitter/receiver unit 43. In case the main body 12 further comprises a key input device (not shown), having a plurality of keys so that a user can manipulate the keys to set functions, the control unit 40 may process an input key signal from the key input device.

Referring now to FIGS. 1, 2A, 2B and 3, the memory 41 stores the upper and lower images photographed respectively by the upward-looking camera 30 and downward-looking camera 50, and assists the control unit 40 in calculating position or driving information.

The transmitter/receiver unit 43 sends data through an antenna 42, and transmits a signal received through the antenna 42 to the control unit 40.

A method for controlling the robot cleaner having the above-described construction by the control unit will be described hereinafter.

The control unit 40 recognizes the current position of the robot by using the known position information of specific objects, such as direct-light fluorescent lamps or fire alarms, evident in the upper images of a ceiling of a work area photographed by the upward-looking camera, or by using position information of marks installed on the ceiling of the work area for position recognition. The memory 41 stores the standard image information of the specific objects for comparison or the marks for position recognition to allow the control unit 40 to recognize the specific object or marks among the images photographed by the upward-looking camera 30. The control unit 40 then calculates a driving path to perform the target work by using the recognized position information and transmits control signals to each part to drive the robot cleaner 10 along the desired driving path.

The control unit 40 recognizes the driving distance and direction of the robot cleaner 10 by using special features, such as spots in the images of the floor, photographed by the downward-looking camera 50, and determines whether the robot cleaner 10 should move along the driving path by using the recognized driving distance and direction, and thereby controls the driving unit 20 to drive the robot cleaner to follow the driving path and not to deviate from the driving path.

Namely, the control unit 40 recognizes position changes of the special features, such as spots, in images by comparing a current image of the floor 15 photographed by the downward-looking camera 50 with an image of the floor 15 photographed before the current image by the downward camera 50, which is stored in the memory 41. The control unit 40, thereafter, calculates the driving distance and direction of the robot cleaner 10 by using the position changes of the special features. Here, all patterns on the floor are different even though some patterns may be seen by human eyes as having the same patterns, because the downward-looking camera 50 can recognize minor differences in the patterns. Thus, there are special features, such as spots and cut-grooves, that cannot easily be seen by human eyes, but can be recognized by the downward-looking camera 50.

Various known methods may be adopted for image processing methods of extracting special features from the photographed images. For example, a method can be adopted which distinguishes pixel points from other neighboring points, after converting the photographed image into a gray level.

Figure 4A:
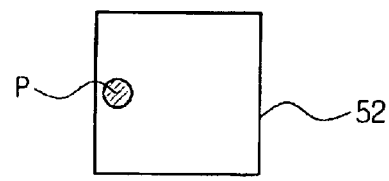
FIG. 4a is a top view showing an image of the floor photographed by a downward camera of the robot cleaner of FIG. 1 while standing still.
Figure 4B:
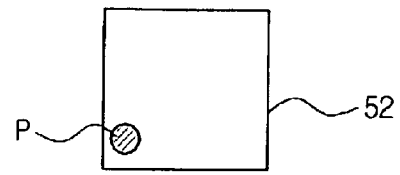
Figure 4C:
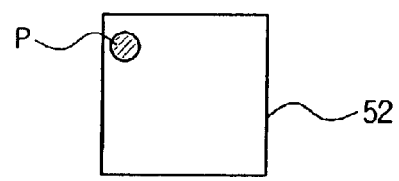
Figure 4D:
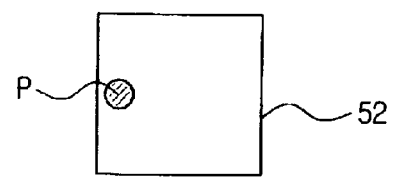
Figure 4E:
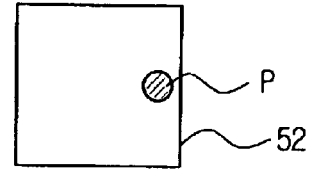
Figure 4F:
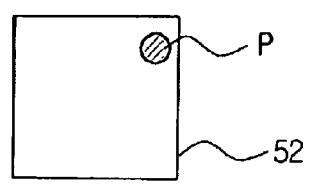

FIGS. 4a to 4f show relationships between the extracted special features and driving directions of the robot cleaner 10. FIG. 4a is an image 52 of the floor photographed by the downward-looking camera 50 at a certain point while the robot cleaner 10 is stopped or moving. Here, a reference mark P is the special feature extracted from the image photographed by the downward-looking camera 50. The special feature P in the image of the floor moves relatively backwards, as shown in FIG. 4b, when the robot cleaner 10 moves forward, while the special feature P moves forward as shown in FIG. 4c when the robot cleaner 10 moves backwards. Further, the special feature P in the image of the floor moves to the left, as shown in FIG. 4d, when the robot cleaner 10 moves to the right, while the special feature P moves to the right, as shown in FIG. 4e, when the robot cleaner 10 moves to the left. Furthermore, the special feature P moves at about a 45 degree angle to the right, as shown in FIG. 4f, when the robot cleaner 10 moves at about a 45 degree angle to the left.

When the downward-looking camera 50 continuously photographs the floor, the special feature P continuously changes positions in the photographed images as shown above. The control unit 40 can then determine the driving distance and direction of the robot cleaner 10 from the position changes of the special feature P. Thereafter, the control unit 40 determines whether the robot cleaner 10 has followed the calculated driving path, and, if the robot cleaner 10 deviated from the calculated driving path, the control unit 40 controls the driving unit 20 to drive the robot cleaner 10 to change the current driving path so as to follow the calculated driving path.

An operation of the control unit 40 will be described hereinafter for controlling the driving unit 20 through the upward-looking camera 30 and downward-looking camera 50.

The control unit 40 recognizes a current position of the robot cleaner 10 by comparing special features or marks for recognition in a current image inputted by the upward-looking camera 30 with the stored special features and marks for recognition, upon receiving a work command signal from the key input device or from the outside wirelessly, and then controls the driving unit 20 corresponding to a target driving path from the recognized position. Here, the work command signal may include a command for cleaning the floor or security work through the cameras.

The control unit 40 calculates a driving error by using the driving distance and direction measured by the downward-looking camera 50 and the current position recognized by comparing the currently photographed upper image with the previously photographed upper images stored in the memory 41, and controls the driving unit 20 to track the target driving path by compensating for the calculated driving error.

The above description provides an example by which the control unit 20 can independently recognize the position of the robot cleaner 10 by directly using image information photographed by the upward-looking camera 30 and downward-looking camera 50.

According to another aspect of the invention, a robot cleaning system is provided which may process calculations required to recognize a position of a robot cleaner 10 externally, in order to reduce the calculation load for the position recognition of the robot cleaner 10.

Figure 3:
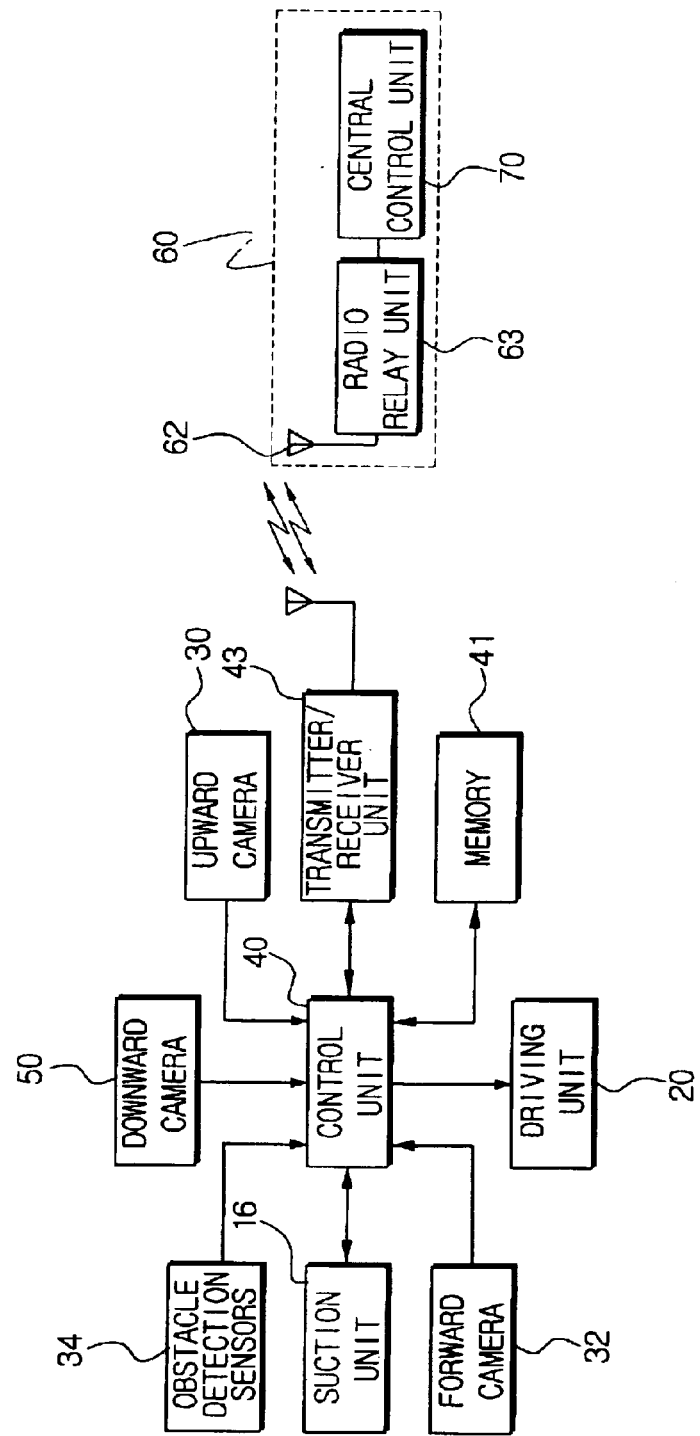
FIG. 3 is a schematic block diagram showing a robot cleaning system in accordance with the invention.

Referring to FIG. 3, the robot cleaner 10 is configured to wirelessly send information regarding the photographed image externally, and further to operate in response to a control signal received from the external command center. A remote controller 60 is provided to wirelessly control the driving of the robot cleaner 10. The remote controller 60 comprises a radio relay unit 63 and a central control unit 70.

The radio relay unit 63 processes a radio signal received from the robot cleaner 10 and transmits the processed signal to the central control unit 70 by wire, and then wirelessly sends a signal received from the central control unit 70 to the robot cleaner 10 through an antenna 62.

Figure 5:
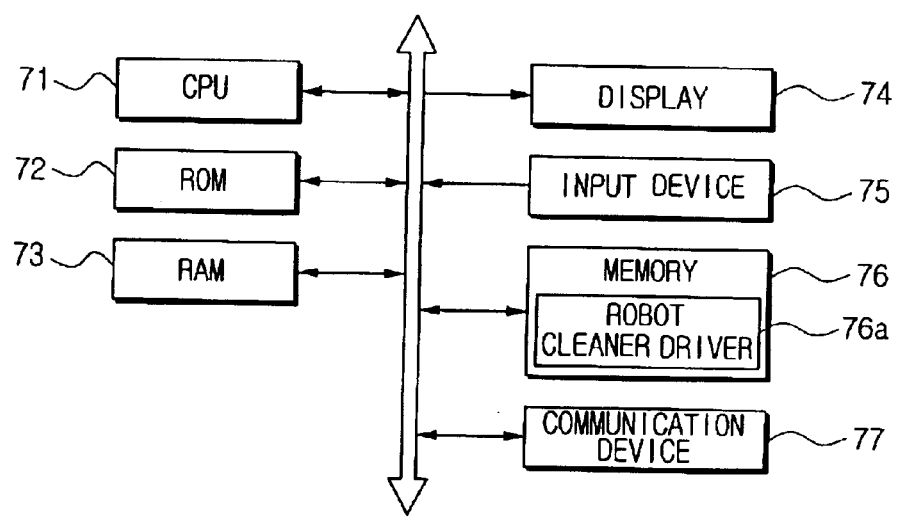
FIG. 5 is a block diagram of the CCU (Central Control Unit) shown in FIG. 3.

The central control unit 70 is constructed with a conventional computer of which one example is shown in FIG. 5. Referring to FIG. 5, the central control unit 70 comprises a CPU 71, a ROM 72, a RAM 73, a display 74, an input device 75, a memory 76 and a communication device 77.

The memory 76 is provided with a robot cleaner driver 76a for processing a signal from the robot cleaner 10.

Upon being operated, the robot cleaner driver 76a provides a menu at the display 74 for setting up the control of the robot cleaner 10, and processes a menu item, selected by a user through the input device 75, to be performed by the robot cleaner 10. Preferably, the menu may include a command for performing cleaning work and/or security work as primary classifications. The menu may further provide sub-selection menus for each primary classification such as a target area selection list and methods to be used for cleaning.

The robot cleaner driver 76a controls the robot cleaner 10 so as to recognize the current position of the robot cleaner 10 by comparing position information of special features or marks for recognition in a current upper image with the position information of the special features and marks for recognition stored in memory, and controls the driving unit 20 corresponding to a target driving path from the recognized position. The robot cleaner driver 76a further calculates any driving error by using the driving distance and direction calculated from the received image of the floor and the current position recognized by comparing the currently received upper image with the previously photographed upper images stored in the memory 76, and controls the driving unit 20 to track the target driving path by compensating for the calculated driving error.

The control unit 40 of the robot cleaner 10 controls the driving unit 20 in response to the control signal received from the radio relay unit 63, and thus the operational load on the internal processor for processing the images in order to recognize the position and to arrange the driving path is diminished significantly. The control unit 40 further transmits the upper image and the image of the floor photographed regularly in a cycle while driving the robot cleaner 10 to the central control unit 70 through the radio relay unit 63.

Figure 6:
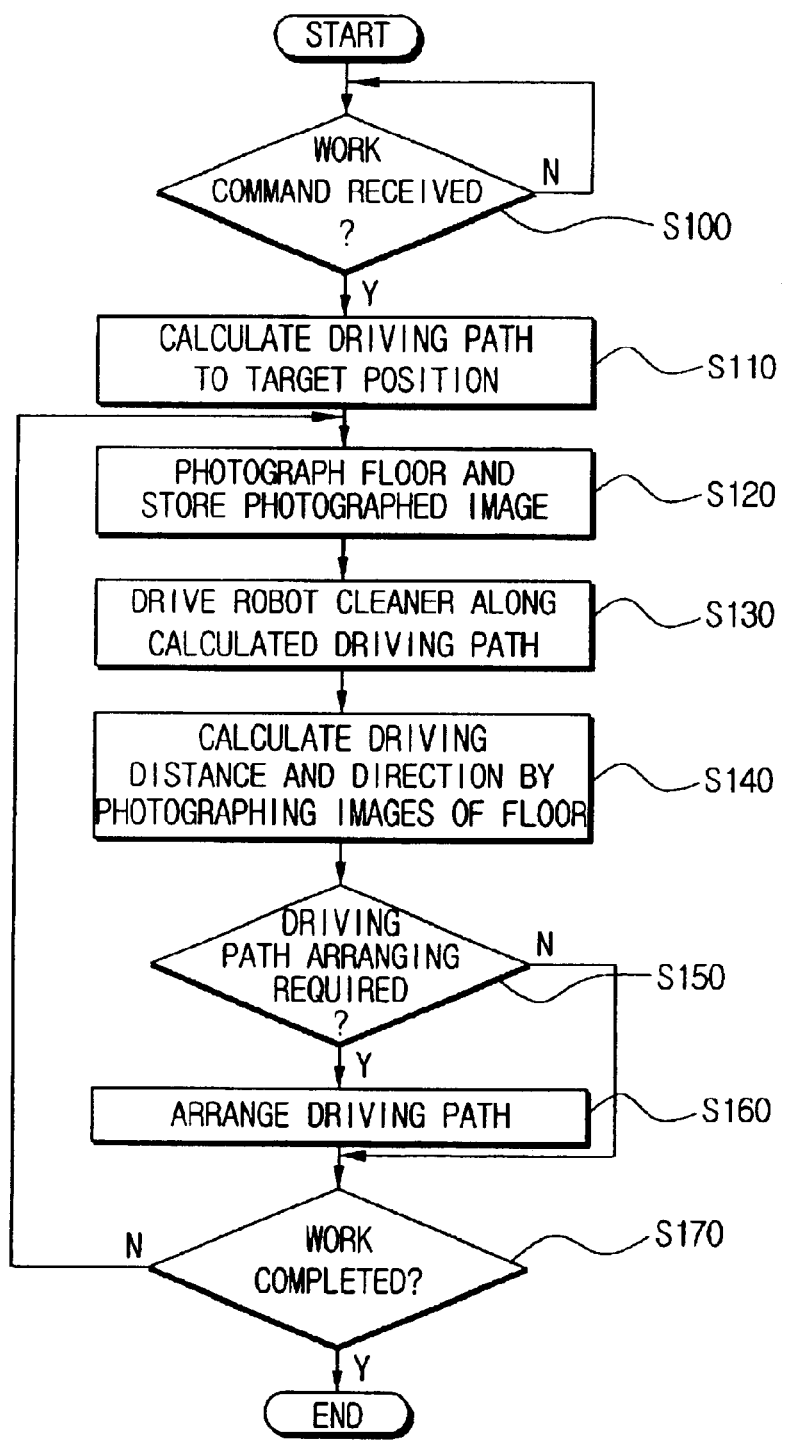
FIG. 6 is a flow chart showing the working process of the robot cleaner in accordance with the invention.

Hereinafter, a method for controlling the robot cleaner 10 by the control unit 40 will be described in detail with reference to FIG. 6.

First, the control unit 40 decides whether a work command has been received, S100.

When the work command is received, the control unit 40 determines the current position of the robot cleaner 10 by using the upper images of the ceiling photographed by the upward-looking camera 30, and calculates a driving path to move to a target position, which is a work area or work path, corresponding to the received work command, S110.

The control unit 40 then photographs images of the floor by the downward-looking camera 50 and stores the photographed floor images, S120.

Consequently, the control unit 40 drives the robot cleaner 10 along the calculated driving path, S130.

The control unit 40 calculates a driving distance and direction by comparing the current image of the floor with the image of the floor photographed right before among the continuously photographed images by the downward-looking camera 50, S140.

Thereafter, the control unit 40 analyzes a current driving path of the robot cleaner 10 to decide whether the current driving path agrees with the calculated driving path, and decide whether the current driving path requires arranging, S150.

When it is decided at step S150 that the current driving path of the robot cleaner 10 requires arranging or correction, the control unit 40 arranges or corrects the current driving path by using the analyzed information at steps S150, S160.

Next, the control unit 40 decides whether the work is completed, S170. The work here refers to work performed by driving the robot cleaner 10, for example, moving of the robot cleaner 10 to a target area or cleaning work performed by driving the robot cleaner 10 along a driving path. If the work is not completed, the control unit 40 repeats steps S130 to S170 until the work is completed, as shown by the loop.

As described above, when the driving distance and direction of the robot cleaner are determined by using the images of the floor photographed by the downward-looking camera according to the invention, no error may be produced even with a slip of the wheels of the driving unit or an irregularity in the floor, which may be produced in the prior art by using the encoder. Therefore, the robot cleaner can efficiently perform the commanded work.

While the invention has been shown and described with reference to certain preferred embodiments thereof, it will be understood by those skilled in the art that various changes in form and detail may be made therein without departing from the spirit and scope of the invention as defined by the appended claims.

The foregoing embodiments and advantages are merely exemplary and are not to be construed as limiting the present invention. The present teaching can be readily applied to other types of apparatus. The description of the present invention is intended to be illustrative, and not to limit the scope of the claims. Many alternatives, modifications, and variations will become apparent to those skilled in the art. In the claims, means-plus-function clauses are intended to cover the structures described herein as performing the recited function and not only structural equivalents but also equivalent structures.

What is claimed is:

1. A robot cleaner for performing a working operation while moving about a floor, comprising:
   a main body;
   a driving unit for driving a plurality of wheels disposed on a bottom portion of the main body;
   a downward-looking camera disposed among the wheels on the bottom portion of the main body for photographing images of the floor perpendicular to a direction of driving the robot cleaner; and a control unit for recognizing the driving distance and direction of the wheels by comparing current image information of the floor photographed by the downward-looking camera with image information of the floor previously memorized by the downward-looking camera, and for controlling the driving unit corresponding to a target work by using the recognized distance and direction of the wheels.

2. The robot cleaner according to claim 1, wherein the downward-looking camera photographs images of the floor at a rate of 1500 times per second.

3. The robot cleaner according to claim 2 further comprising an illuminator disposed on the bottom portion of the main body for illuminating an area photographed by the downward-looking camera to render it brighter than surrounding areas.

4. A robot cleaner for performing a working operation while moving about a floor, comprising:

a main body;

a driving unit for driving a plurality of wheels disposed on a bottom portion of the main body;

a downward-looking camera disposed among the wheels on the bottom of the main body for photographing images of the floor perpendicular to a direction of driving the robot cleaner;

an upward-looking camera disposed on a top of the main body for photographing images of a ceiling perpendicular to the driving direction; and a control unit for recognizing a position of the robot cleaner by using image information of the ceiling photographed by the upward-looking camera and for recognizing a driving distance and direction of the wheels by comparing current image information of the floor photographed by the downward-looking camera with image information of the floor previously memorized by the downward-looking camera, and further for controlling the driving unit corresponding to the targeted work by using the recognized position, distance end direction.

5. The robot cleaner according to claim 4, wherein the downward-looking camera photographs images of the floor at a rate of 1500 time per second.

6. The robot cleaner according to claim 5 further comprising an illuminator disposed on the bottom portion of the main body for illuminating an area photographed by the downward-looking camera so as to render it brighter than surrounding areas.

7. A robot cleaning system comprising:

a robot cleaner including:
a main body,
a driving unit for driving a plurality of wheels disposed on a bottom of the main body, and
an upward camera disposed on a top of the main body for photographing images of a celling perpendicular to a direction of driving the robot cleaner; and a remote control unit for communicating wirelessly with the robot cleaner, wherein the robot cleaner further include, a downward camera disposed among the wheels on the bottom of the main body for continuously photographing images of the floor perpendicular to the driving direction, and the remote control unit recognizes a driving distance and direction of the wheels by comparing current image information of the floor photographed by the downward camera with image information of the floor previously memorized by the downward camera and controls the driving unit corresponding to a target work by using the recognized distance and direction of the wheels.

8. The robot cleaning system according to claim 7, wherein the downward-looking camera photographs images of the floor at a rate of 1500 times per a second.

9. The robot cleaning system according to claim 8 further comprising an illuminator disposed on the bottom portion of the main body for illuminating an area photographed by the downward-looking camera brighter than surrounding areas.

10. A method for controlling a robot cleaner having a downward camera, comprising the steps of:

calculating a driving path to a target area corresponding to a work, upon receiving a work command;

storing images of a floor photographed by the downward-looking camera;

driving the robot cleaner along the calculated driving path; and comparing the current image of the floor photographed by the downward-looking camera with the stored images to calculate a driving distance and direction, and thereafter correcting the driving path.

* * * * *